(12) United States Patent
Li et al.

(10) Patent No.: US 11,441,729 B2
(45) Date of Patent: Sep. 13, 2022

(54) DEVICE FOR RECOVERING, SEPARATING AND PURIFYING OIL MIST IN MINIMUM QUANTITY LUBRICANT GRINDING PROCESS

(71) Applicants: QINGDAO UNIVERSITY OF TECHNOLOGY, Qingdao (CN); CHONGQING UNIVERSITY, Chongqing (CN); SHANGHAI JINZHAO ENERGY SAVING TECHNOLOGY CO., LTD, Shanghai (CN)

(72) Inventors: Changhe Li, Qingdao (CN); Zhenjing Duan, Qingdao (CN); Huajun Cao, Chongqing (CN); Xuefeng Xu, Qingdao (CN); Naiqing Zhang, Shanghai (CN); Lan Dong, Qingdao (CN); Yanbin Zhang, Qingdao (CN); Xiufang Bai, Qingdao (CN); Wentao Wu, Qingdao (CN); Teng Gao, Qingdao (CN); Min Yang, Qingdao (CN); Dongzhou Jia, Qingdao (CN); Runze Li, Qingdao (CN); Yali Hou, Qingdao (CN)

(73) Assignees: QINGDAO UNIVERSITY OF TECHNOLOGY, Qingdao (CN); CHONGQING UNIVERSITY, Chongqing (CN); SHANGHAI JINZHAO ENERGY SAVING TECHNOLOGY CO., LTD, Shanghai (CN)

( * ) Notice: Subject to any disclaimer, the term of this patent is extended or adjusted under 35 U.S.C. 154(b) by 451 days.

(21) Appl. No.: 16/726,169

(22) Filed: Dec. 23, 2019

(65) Prior Publication Data
US 2020/0248867 A1    Aug. 6, 2020

(51) Int. Cl.
*F01M 1/00* (2006.01)
*F16N 7/32* (2006.01)
(Continued)

(52) U.S. Cl.
CPC ............ *F16N 7/32* (2013.01); *B23Q 11/1046* (2013.01); *B23Q 11/1069* (2013.01);
(Continued)

(58) Field of Classification Search
CPC ... F16N 7/32; B23Q 11/1046; B23Q 11/1069; B24B 55/12; B01D 45/16; B01D 50/20;
(Continued)

(56) References Cited

U.S. PATENT DOCUMENTS

| | | | | |
|---|---|---|---|---|
| 1,982,639 A | * | 12/1934 | Christofferson | B01D 46/18 55/354 |
| 2,722,993 A | * | 11/1955 | Gerber | A47L 9/1427 206/820 |

(Continued)

FOREIGN PATENT DOCUMENTS

| | | | | |
|---|---|---|---|---|
| CN | 1773196 A | * | 5/2006 | ............ F25B 43/003 |
| CN | 105435574 A | * | 3/2016 | |

(Continued)

*Primary Examiner* — Dung H Bui
(74) *Attorney, Agent, or Firm* — Andrew C. Cheng

(57) ABSTRACT

The present invention relates to a device for recovering, separating and purifying oil mist in a minimum quantity lubricant (MQL) grinding process, comprising: an air separating mechanism, which comprises a pipeline and a fan fixedly connected with one end of the pipeline, wherein the fan is used for forming negative pressure in the pipeline, at least one conical filter mesh mechanism is arranged in the pipeline, and a tip of the conical filter mesh mechanism faces one side of an air inlet direction of the pipeline; and a filtering and recovering mechanism, which is connected with the pipeline and comprises a tank body, a filtering
(Continued)

mechanism and a recovering mechanism, wherein the tank body is connected with the pipeline by a connecting part, and the filtering mechanism is connected with the recovering mechanism.

9 Claims, 9 Drawing Sheets

(51) Int. Cl.
  *B23Q 11/10*     (2006.01)
  *B24B 55/12*     (2006.01)
  *F01M 13/04*     (2006.01)
  *B01D 45/16*     (2006.01)
  *F16C 33/66*     (2006.01)
  *B01D 50/20*     (2022.01)

(52) U.S. Cl.
  CPC .............. *B24B 55/12* (2013.01); *B01D 45/16* (2013.01); *B01D 50/20* (2022.01); *B01D 2273/30* (2013.01); *F01M 2013/0438* (2013.01); *F16C 33/6662* (2013.01)

(58) Field of Classification Search
  CPC .... B01D 2273/30; B01D 46/10; B01D 50/10; B01D 50/40; B01D 50/60; F01M 2013/0438; F01M 2013/0466; F16C 33/6662; Y02P 70/10
  See application file for complete search history.

(56) References Cited

U.S. PATENT DOCUMENTS

| | | | | |
|---|---|---|---|---|
| 3,062,732 | A * | 11/1962 | Keidel | F26B 3/34 204/278 |
| 3,375,638 | A * | 4/1968 | Dungler | B01D 46/18 55/351 |
| 4,153,008 | A * | 5/1979 | Marino | B05B 14/43 55/351 |
| 4,221,576 | A * | 9/1980 | Phillips, Jr. | B01D 46/20 55/352 |
| 4,378,980 | A * | 4/1983 | Long | B01D 46/185 55/470 |
| 4,405,342 | A * | 9/1983 | Bergman | B03C 3/10 55/354 |
| 4,881,957 | A * | 11/1989 | Shofner | B01D 46/20 55/352 |
| 5,190,018 | A * | 3/1993 | Costello | F01M 13/04 123/573 |
| 5,549,722 | A * | 8/1996 | Zemaitis | B01D 50/20 55/463 |
| 5,599,363 | A * | 2/1997 | Percy | B01D 46/20 55/354 |
| 5,912,423 | A * | 6/1999 | Doughty | F24F 8/10 95/107 |
| 6,811,685 | B2 * | 11/2004 | Wanni | B01D 29/09 96/429 |
| 6,833,023 | B1 * | 12/2004 | Vandenberghe | B01D 50/20 55/498 |
| 7,186,290 | B2 * | 3/2007 | Sheehan | B01D 46/46 55/497 |
| 7,931,718 | B2 * | 4/2011 | Cheng | B01D 45/16 96/417 |
| 8,276,650 | B2 * | 10/2012 | Martin | F01P 11/12 165/41 |
| 10,352,239 | B2 * | 7/2019 | Brun | F02C 7/052 |
| 10,385,746 | B2 * | 8/2019 | Zhang | F01N 3/027 |
| 2005/0081495 | A1 * | 4/2005 | Wei | B01D 46/22 55/290 |
| 2006/0042204 | A1 * | 3/2006 | Endo | B01D 50/20 55/337 |
| 2007/0012188 | A1 * | 1/2007 | Tandon | B01D 46/682 95/273 |
| 2012/0297740 | A1 | 11/2012 | Cheng | |
| 2013/0327005 | A1 * | 12/2013 | Menssen | B01D 46/2411 55/502 |
| 2014/0109337 | A1 * | 4/2014 | Krebs | A47L 9/127 15/353 |
| 2016/0250578 | A1 * | 9/2016 | Lee | B01D 46/0002 55/333 |
| 2016/0251987 | A1 * | 9/2016 | De Luca | F02D 41/22 123/573 |
| 2017/0362977 | A1 * | 12/2017 | Zhang | B01D 46/84 |
| 2018/0178155 | A1 * | 6/2018 | Nicolaou | B01D 46/681 |
| 2018/0192841 | A1 * | 7/2018 | Nicolaou | B01D 46/681 |
| 2019/0111374 | A1 * | 4/2019 | Burton | B01D 46/10 |

FOREIGN PATENT DOCUMENTS

| | | | | |
|---|---|---|---|---|
| CN | 205308019 | U * | 6/2016 | |
| CN | 107185338 | A * | 9/2017 | |
| CN | 107261721 | A * | 10/2017 | |
| CN | 207668987 | U * | 7/2018 | |
| CN | 207734770 | U | 8/2018 | |
| CN | 108744817 | A * | 11/2018 | |
| CN | 109078440 | A * | 12/2018 | ........... B01D 50/002 |
| CN | 109758856 | A * | 5/2019 | ......... B23Q 11/1046 |
| CN | 110102132 | A | 8/2019 | |
| CN | 110975576 | A * | 4/2020 | |
| CN | 111001252 | A * | 4/2020 | |
| CN | 110252047 | B * | 9/2021 | ............ B01D 45/02 |
| EP | 3610956 | A1 * | 2/2020 | |
| ES | 2282650 | T3 * | 10/2007 | ............ B01D 27/06 |
| JP | 2019126803 | A * | 8/2019 | ............ B01D 45/16 |
| WO | WO-2007003159 | A2 * | 1/2007 | ............ B01D 45/16 |
| WO | WO-2007066142 | A1 * | 6/2007 | ............ B01D 45/08 |
| WO | WO-2009034050 | A1 * | 3/2009 | ......... B01D 46/0004 |

* cited by examiner

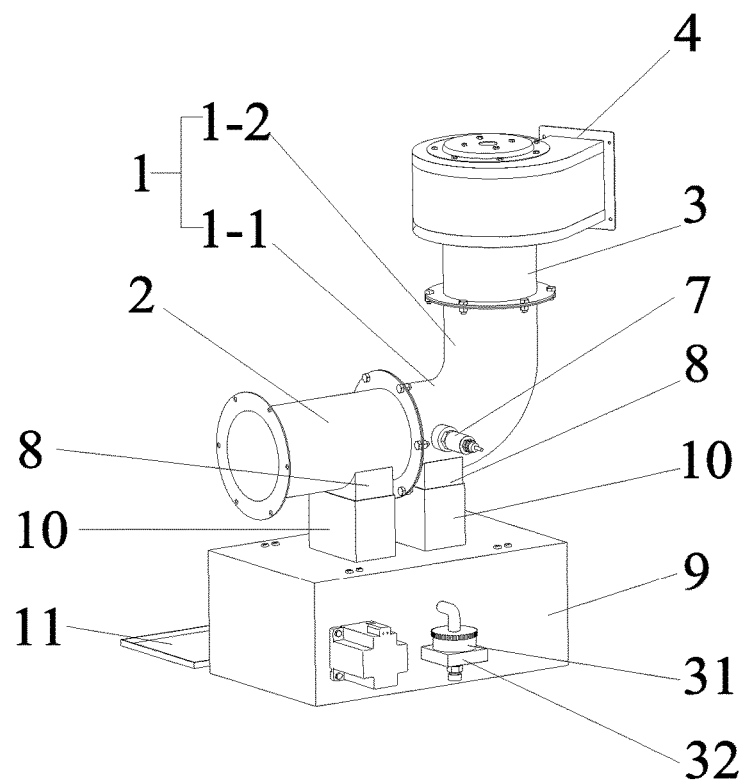
FIG. 1
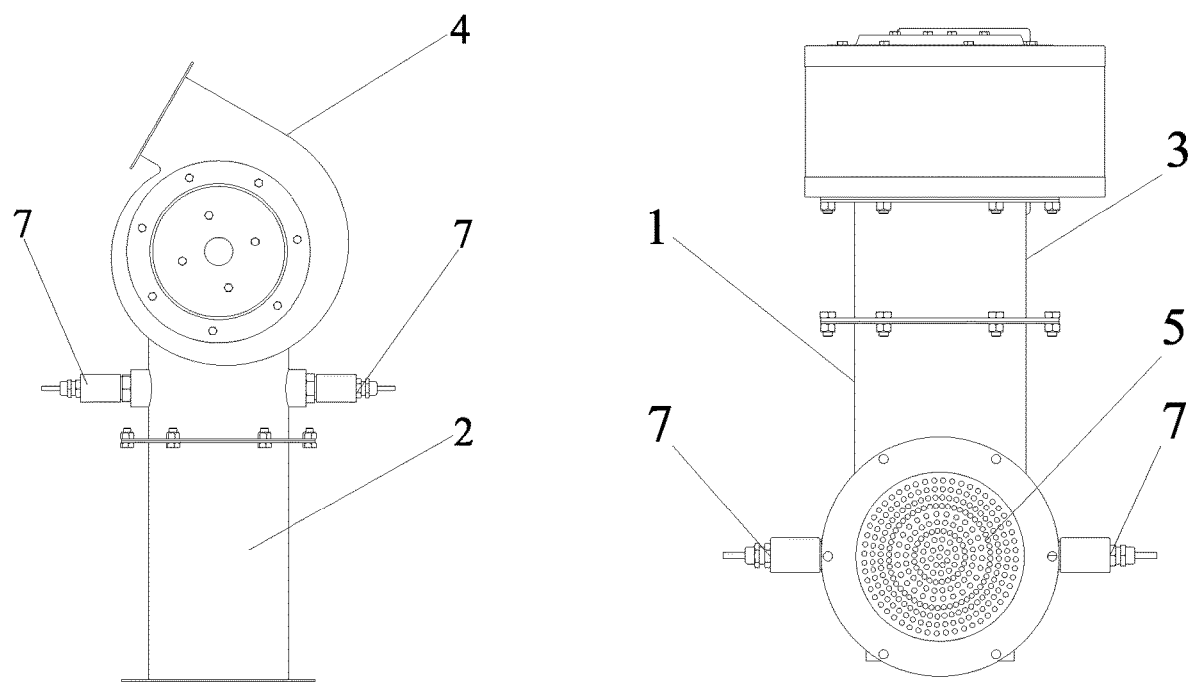
FIG. 2
FIG. 3

DEVICE FOR RECOVERING, SEPARATING AND PURIFYING OIL MIST IN MINIMUM QUANTITY LUBRICANT GRINDING PROCESS

CROSS-REFERENCE TO RELATED APPLICATIONS

This application claims priority to Chinese Patent Application No. 201910100369.2 with a filing date of Jan. 31, 2019. The content of the aforementioned applications, including any intervening amendments thereto, are incorporated herein by reference.

TECHNICAL FIELD

The present invention relates to the technical field of grinding equipment, and particularly relates to a device for recovering, separating and purifying oil mist in a minimum quantity lubricant (MQL) grinding process.

BACKGROUND OF THE PRESENT INVENTION

At present, grinding plays an inestimable important role in machining. Particularly, a minimum quantity lubricant (MQL) technology between pouring type wet grinding and dry grinding is applied to the grinding field under a background of advocating green machining. High-pressure air flow plays a role of cooling and chip removal. Lubricant oil adheres to a machined surface of a workpiece to form a protective film, thereby playing an MQL role. The technology combines advantages of the pouring type grinding and the dry grinding, and has a lubrication effect almost the same as that of the traditional pouring type grinding. Alkyl, ester using vegetable oil as base oil is, generally adopted as a lubricant, and has the characteristics of excellent biodegradability, high lubrication performance and viscosity index, low volatility, renewability, short production cycle, less environmental diffusion and the like. The technology has a usage of the lubricant being only a few thousandths of that of traditional machining methods, thereby greatly improving the working environment, and is a high-efficiency and low-carbon machining technology. In order to improve the cooling effect and the lubrication effect, different nanoparticles can also be added to the lubricant. In the MQL grinding process, the high-pressure air flow will make a part of atomized lubricant be scattered around. The atomized lubricant is doped with chips and is also doped with nanoparticles when the nanoparticles are used, thereby forming oil haze. If workers are exposed to such an environment for a long time, the oil, haze inhaled by the bodies will have a certain impact on health. Fine particles such as the chips and the nanoparticles in the oil haze enter the lungs after entering the respiratory tracts, then are hard to be completely removed, are accumulated for a long time to cause great damage to the lungs, and may cause airway dysfunction and respiratory diseases of the workers. In the early days, the research on allergic pneumonia was not performed on the workers exposed to metal oil mist. However, due to sharp increase in the number of workers suffering from allergic pneumonia in recent years, the fact that long-term exposure to the oil mist will lead to pneumonia has been researched and confirmed. Research data on influence of the metal-containing oil mist on lung function of the workers are still relatively deficient. One reason, is that most of the lung function decline that can be observed is unrecoverable. In addition, the lung function decline is related to the amount of the contacted oil mist and is a result of long-term accumulation. However, results of the research on animals show that dogs will have fatty alveoli and macrophage lipogranuloma and will have morphological changes in respiratory tissues after exposure to 5-100 mg/m3 of oil mist for more than 12 months. If the concentration of the oil mist is too high, the oil mist will seep into, a machine and adhere to electrical elements; once energization, the elements will be heated to generate heat; since the elements are placed in a limited space, serious heat accumulation may burn out a mainboard and the machine and may also cause larger fires. The adhesion of high-concentration oil mist to the surface of the machine is also a trouble for cleaning.

After searching, Dai Qin invented an oil mist device with a filter (Patent Number: 201410650610.6). Particularly, an oil mist device with the filter is involved and comprises a housing and an end cover, wherein the end cover is arranged above the housing, which is characterized in that a filter element and an oil barrel are arranged inside the housing; an oil mist device cover is arranged at an upper part of the oil barrel; an oil mist device inlet and an oil mist device outlet are arranged at an upper end of the oil mist device cover; a channel is arranged between the oil mist device inlet and the oil mist device outlet; the upper part of the filter element is connected with the end cover; an air inlet and an air outlet are formed in the end cover; the air inlet is communicated with a space outside the filter element in the housing; the air outlet of the filter element is connected with the oil mist device inlet; and the oil mist device outlet is connected with the air outlet on the end cover. The inventor found that the present invention cannot recover and filter the oil for reutilization.

After searching, Zhao Junwu et al. invented an oil mist filter for loudspeaker production (Patent Number: 20171140817.8), comprising a filter housing. An air inlet and an air outlet, as well as a telescopic pipe and an air outlet pipe which are connected with the air inlet and the air outlet are arranged on both sides of the filter housing; an air restraining pipe and an air duct are arranged between the air inlet and the air outlet; a mesh filter, a centrifugal impeller, a primary filter, a secondary filter and a tertiary filter are arranged in the air duct; and an auxiliary draft fan is arranged, in the air outlet pipe. The present invention has simple structure and reasonable design, performs primary filtration by the mesh filter, adsorbs large particles in the surrounding environment, then adsorbs and filters harmful substances by a multi-stage activated carbon filter, can greatly improve the environmental quality during speaker production and can ensure the safety and health of workers. The inventors found that treatment, purification and recycling of the filtered oil are not considered in the present invention.

After searching, Song Zhiming invented an oil mist filter (Patent Number: 201721227764.X). An oil mist filter is designed and comprises a filter housing, an oil mist suction port arranged at an end part of the filter housing, a distribution mesh arranged inside the oil mist suction port, a primary filter mesh, a wind wheel, a secondary filter mesh and a motor arranged inside the secondary filter mesh. An output shaft of the motor is connected with a shaft cover; a blade handle is fixed on the output shaft of the motor by the shaft cover and is fixedly connected with the wind wheel; a sealed box is arranged above the rear of the filter housing; an activated carbon filter layer housing is arranged above the sealed box; an air flow stabilizing mesh plate is arranged at the bottom of the activated carbon filter layer housing; an activated carbon filter layer is arranged above the air flow stabilizing mesh plate; a glass fiber filter layer is arranged above the activated carbon filter layer; and an exhaust mesh plate is arranged above the glass fiber filter layer. The inventor found that the treatment of impurities such as oil and chips separated from the oil haze, and the recycling of oil are not considered in the present invention.

After searching, Ma Changhuan et al. invented an oil mist filter cyclone-separation device for an air compressor (Patent Number: 201721027059.5). The oil mist filter cyclone-separation device for the air compressor comprises a cylindrical fixing base composed of a hollow flat plate and a cylindrical vertical plate. A high-pressure oil mist inlet and a low-pressure oil mist inlet opposite to each other are formed in the cylindrical vertical plate; a hollow cylinder opposite to a through hole of the hollow flat plate is arranged on an upper side of a middle part of the hollow flat plate; a hollow cyclone cylinder opposite to the through hole of the hollow flat plate is arranged on a lower side of the middle part of the hollow flat plate; an annular blade fixing plate is arranged at a position opposite to and lower than the oil mist inlet on the hollow cyclone cylinder; a plurality of inclined blades with the same inclination direction are uniformly inserted into the annular fixing plate along a circumferential direction; and, the inclination direction of the inclined blades is opposite to the direction of the high-pressure oil mist inlet. The inventors found that the treatment of impurities such as oil and chips separated from the oil haze, and the recycling of oil are not considered in the present invention.

The inventors found that there is no device or method for recovering and separating the oil mist generated in the MQL grinding process and then purifying to reutilize the purified lubricating liquid.

SUMMARY OF PRESENT INVENTION

The purpose of the present invention is to overcome the defects of the prior art, so as to provide a device for recovering, separating and purifying oil mist in an MQL grinding process. The device can recover, separate and purify the oil mist generated in the grinding process, can reutilize oil liquid, meets requirements of green manufacturing and machining, benefits health of operators and prolongs the service life of grinding equipment.

In order to achieve the above purpose, the following technical solution is adopted in the present invention:

A device for recovering, separating and purifying oil mist in an MQL grinding process comprises:

an air separating mechanism, which is used for separating oil mist and particles in air and comprises a pipeline and a fan fixedly connected with one end of the pipeline, wherein the fan is used for forming negative pressure in, the pipeline, at least one conical filter mesh, mechanism is arranged in the pipeline, a tip of the conical filter mesh mechanism faces one side of an air inlet direction of the pipeline, and the conical filter mesh mechanism is used for separating the oil mist and the particles in air; and a filtering and recovering mechanism, which is connected with the pipeline and used for filtering and recovering the oil mist separated by the air separating mechanism, and comprises a tank, body, a filtering mechanism and a recovering mechanism, wherein the tank body is connected with the pipeline by a connecting part, the filtering mechanism is used for filtering the separated oil mist and is connected with the recovering mechanism, and the recovering mechanism is used for recovering the oil liquid filtered by the filtering mechanism.

The fan is arranged to drive air to flow in from, one end of the pipeline and discharge from an air outlet of the fan. The conical filter mesh mechanism is arranged to separate the oil mist and the particles in air flowing in the pipeline, so that the discharged air is clean. The filtering and recovering, device is arranged to filter and recover oil mist droplets and particles separated by a conical filter mesh to meet the requirements of green manufacturing and machining.

Further, the pipeline is an L-shaped pipeline and comprises a horizontal part and a vertical part; the horizontal part is connected with the filtering and recovering mechanism through a connecting part; and an end part of the vertical part is connected with the fan.

Further, the conical filter mesh mechanism comprises a mounting ring; the conical filter mesh is fixed on the mounting ring; a plurality of mounting grooves are formed in the mounting ring; and the mounting ring is fixedly connected by clamping the mounting grooves and clamping blocks arranged on an inner surface of the pipeline.

The mounting grooves and the clamping blocks are fixed by clamping so that the conical filter mesh mechanism is conveniently disassembled, and grinding particles on the conical filter mesh are conveniently cleaned.

Further, the pipeline is connected with a pressure detection device for detecting air pressure in the pipeline.

Further, the filtering mechanism comprises an electromagnetic plate, filter paper and an oil box; the electromagnetic plate is arranged in the connecting part for absorbing metal grinding particles; the filter paper is arranged in the tank body for filtering the oil mist passing through the electromagnetic plate; the oil box is used for collecting the oil liquid filtered by the filter paper; the oil box is connected with the recovering mechanism; and the oil liquid is recovered by the recovering mechanism for reutilization.

Further, one end of the filter paper is wound on a filter paper cylinder rotationally connected with a tank wall of the tank body; the filter paper cylinder is used for winding an unused part of the filter paper; the other end of the filter paper is connected with a filter paper storage device; and the filter paper storage device is used for storing a used part of the filter paper.

Further, a carrying idler is also arranged in the tank body and is used for tensioning a filter paper part between the filter paper cylinder and the filter paper storage device.

Further, an upper part of the oil box is connected with a mesh rack; and the mesh rack is used for supporting the filter paper part above the oil box.

Further, the filter paper storage device comprises a storage cylinder; the storage cylinder is connected with a driving mechanism; the driving mechanism is used for driving the rotation of the storage cylinder; a rolling cylinder is arranged in the storage cylinder; the end part of one side of the rolling cylinder is rotationally connected with the end part of the same side of the storage cylinder; an axis of the rolling cylinder is not in the same straight line with the axis of the storage cylinder; a paper inlet parallel to the axis of the storage cylinder is arranged on a cylinder wall of the storage cylinder; the paper inlet is located at a position where a distance between cylindrical surfaces of an inner cylinder surface of the storage cylinder and, an outer cylinder surface of the rolling cylinder is minimum; a notch is formed in the cylinder wall of the rolling cylinder; the end part of the filter paper can extend into the rolling cylinder through the paper inlet and the notch; the minimum distance between the cylindrical surfaces of the inner cylinder surface of the storage cylinder and the outer cylinder surface of the rolling cylinder meets a requirement that the inner cylinder surface of the storage cylinder can compress the filter paper together with the outer cylinder surface of the rolling cylinder.

The end part of the filter paper extends into the rolling cylinder; the rolling cylinder is rotated; the outer cylinder surface of the rolling cylinder and the inner cylinder surface of the storage cylinder compress the filter paper; and the storage cylinder are rotated to wind the filter paper on the outer cylinder surface of the storage cylinder.

Further, the recovering mechanism comprises an oil cup fixed outside the tank body; the oil cup is connected with one end of an oil pipe; and the other end of the oil pipe extends into the tank body and is connected with the oil box.

Beneficial Effects of the Present Invention

The device for recovering, separating and purifying the oil mist provided by the present invention separates the oil mist and the particles in air by the conical filter mesh mechanism, filters and recovers the separated oil mist by the filtering and recovering mechanism, realizes reutilization of the oil liquid, meets the requirements of green manufacturing and machining, makes air in a grinding space cleaner and fresher and more beneficial to health of the operators, prevents the grinding, equipment from being contaminated with oil stains, realizes a better working environment, better ensures the quality of products and also improves efficiency.

DESCRIPTION OF THE DRAWINGS

The drawings of the specification, which form a part of the present application, are used for providing a further understanding of the present application. Exemplary embodiments of the present application and the description thereof are used for explaining the present application, rather than constituting a limitation to the present application.

FIG. 1 is a schematic diagram of an overall structure according to an embodiment of the present invention;

FIG. 2 is a schematic top view of assembly of a pipeline and a fan according to an embodiment of the present invention;

FIG. 3 is a schematic side view of assembly of a pipeline and a fan according to an embodiment of the present invention;

Figure 4:
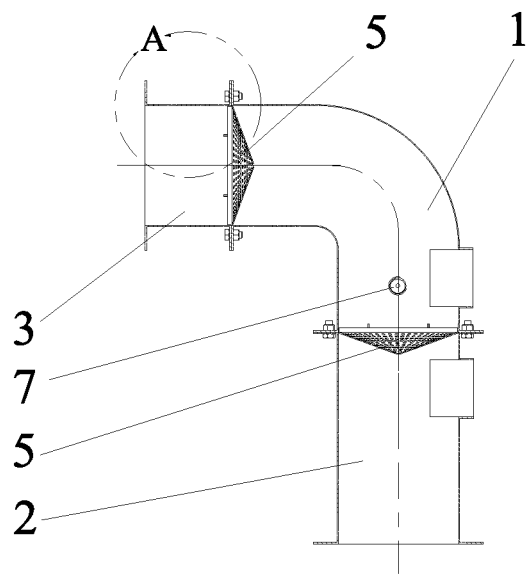
FIG. 4 is a schematic diagram of assembly of a conical filter mesh, mechanism and a pipeline according to an embodiment of the present invention.

In the figures, 1. L-shaped pipe, 1-1. horizontal pipe, 1-2. vertical pipe, 2. first straight pipe, 3. second straight pipe, 4. fan, 5. conical filter mesh mechanism, 5-1. mounting ring, 5-1-1. mounting groove, 5-2. filter mesh 6. clamping block, 7. pressure sensor, 8. first connecting pipe, 9. tank body, 10. second connecting pipe, 11. tank cover, 12. electromagnetic plate, 13. filter paper, 14. oil box, 15. filter paper cylinder, 16. storage cylinder, 17. servo motor, 18. sealing ring, 19. key, 20. rolling cylinder, 21. connecting shaft, 22. boss, 23. spacer bush, 24. paper inlet, 25. notch, 26. rotating plate, 27. carrying idler, 28. carrying idler connecting plate, 29. connecting rod, 30. mesh rack, 30-1. supporting leg, 30-2. metal mesh, 31. oil cup, 32. oil cup support, 33. first oil pipe, and 34. second oil pipe.

DETAILED DESCRIPTION OF PREFERRED EMBODIMENTS

It should be noted that the following detailed description is exemplary and is intended to provide further description of the present application. Unless otherwise specified, all technical and scientific terms used herein have the same meanings as commonly understood by those ordinary skilled in the art to which the present application belongs.

It should be noted that the terms used herein is intended to describe specific embodiments only, rather than limit the exemplary embodiments according to the present application. As used herein, the singular form is also intended to comprise the plural form unless otherwise clearly specified in the context. In addition. it should be understood that the terms "contain" and/or "comprise" used in the present specification indicate the presence of features, steps, operations, devices, components and/or combinations thereof.

For convenience of description, the words "upper", "lower", "left" and "right" present in the present invention only indicate that they are consistent with the upper, lower, left and right directions of the drawing, do not limit the structure, are only used for the convenience of description of the present invention and simplification of description, do not indicate or imply that the referred equipment or components must have a particular azimuth and must be constructed and operated in the particular azimuth, and therefore cannot be understood as a limitation to the present invention.

As introduced in the background, there is no device or method for recovering and separating oil mist generated in an MQL grinding process and then purifying to reutilize the purified lubricating liquid at present. In view of the above problems, the present application proposes a device for recovering, separating and purifying the oil mist in the MQL grinding process.

Figure 5:
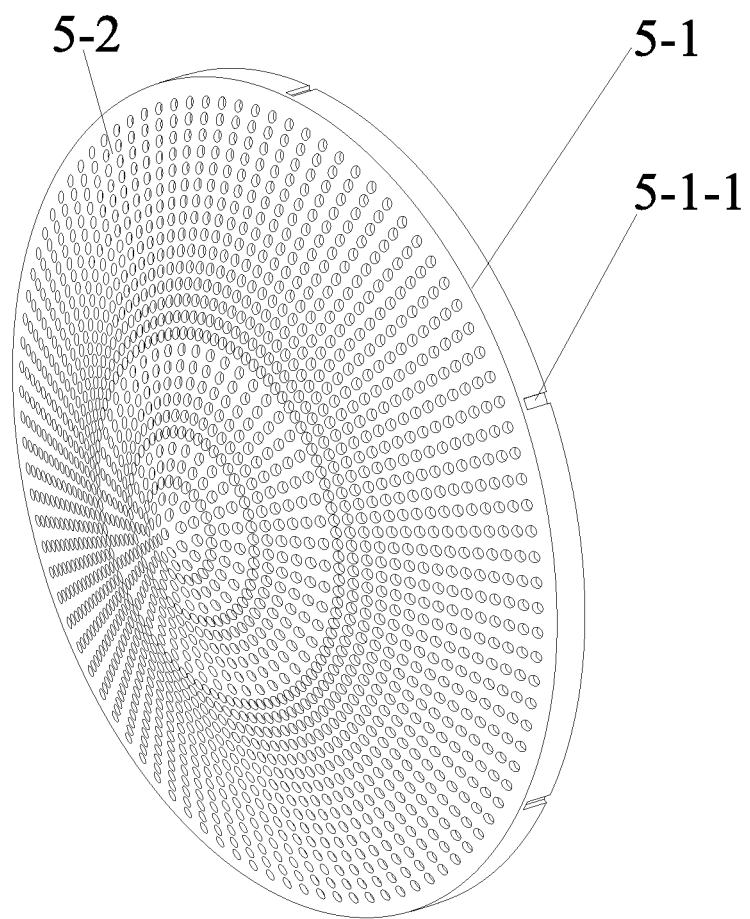
FIG. 5 is a structural schematic diagram of a conical filter mesh mechanism according to an embodiment of the present invention.
Figure 6:
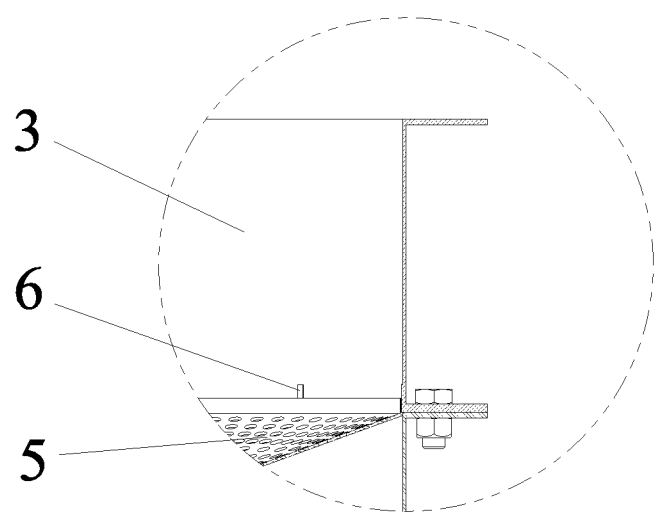
FIG. 6 is an enlarged view of a position A in FIG. 4 according to the present invention.
Figure 7:
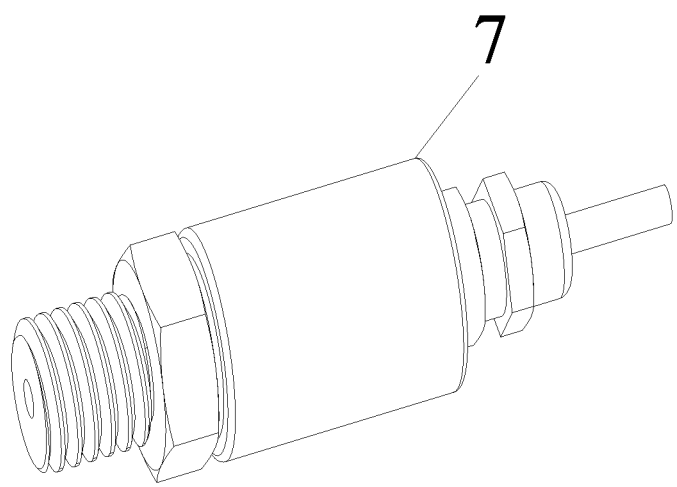
FIG. 7 is a structural schematic diagram of a pressure sensor according to an embodiment of the present invention.
Figure 8:
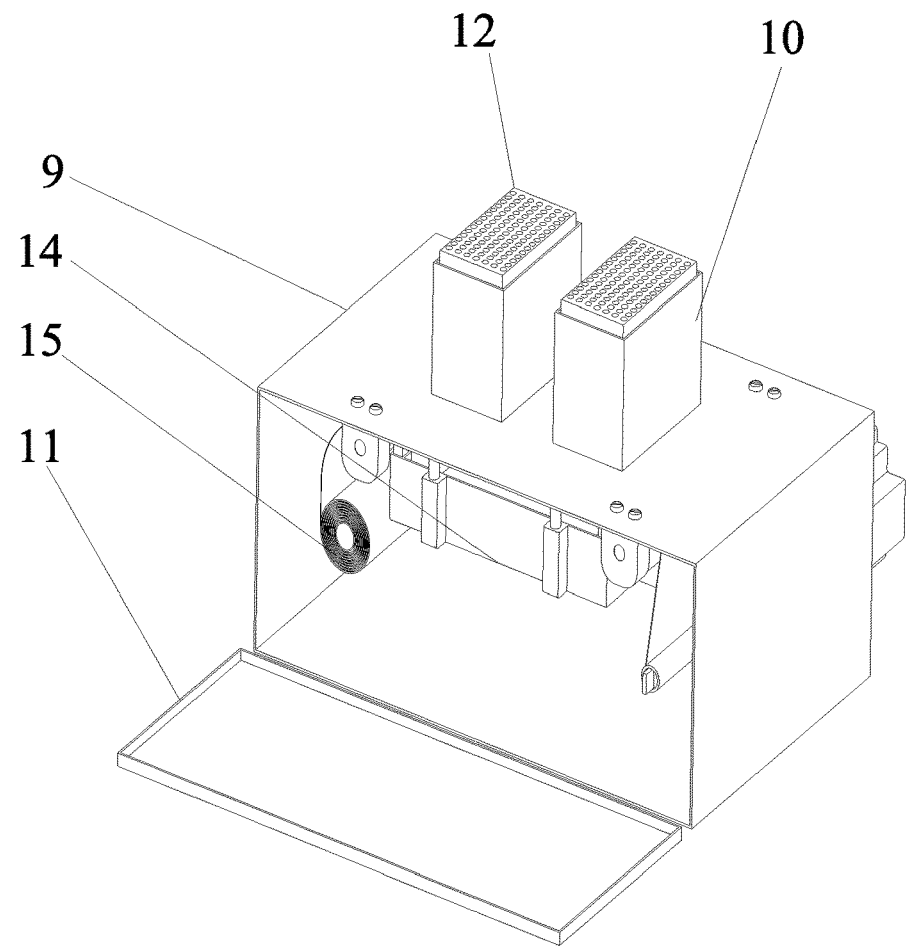
FIG. 8 is a structural schematic diagram of a filtering and recovering, mechanism according to an embodiment of the present invention.
Figure 9:
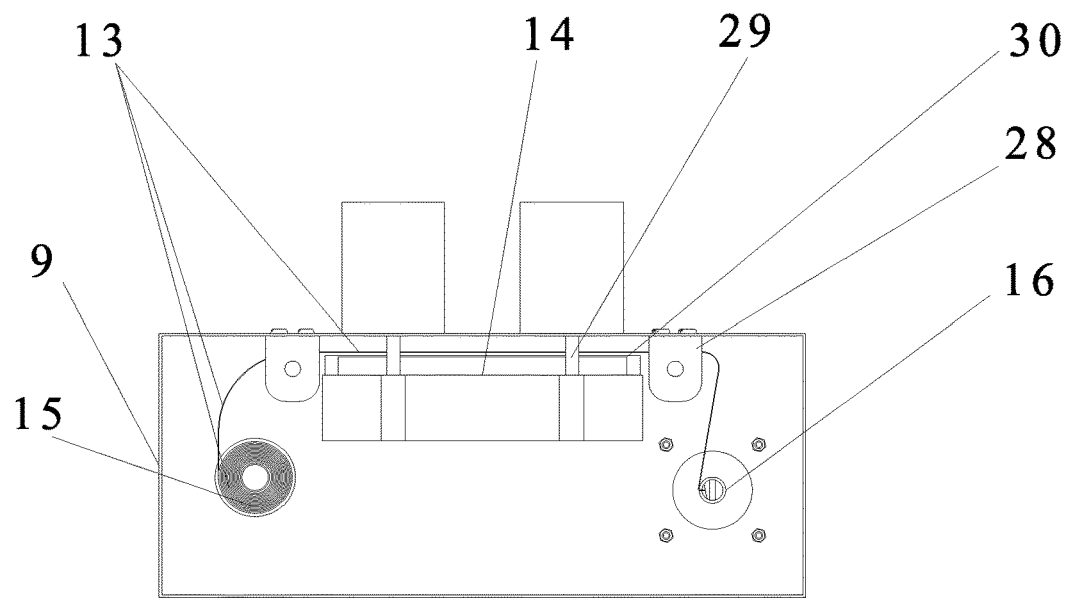
FIG. 9 is a schematic front view of a filtering and recovering mechanism according to an embodiment of the present invention.
Figure 10:
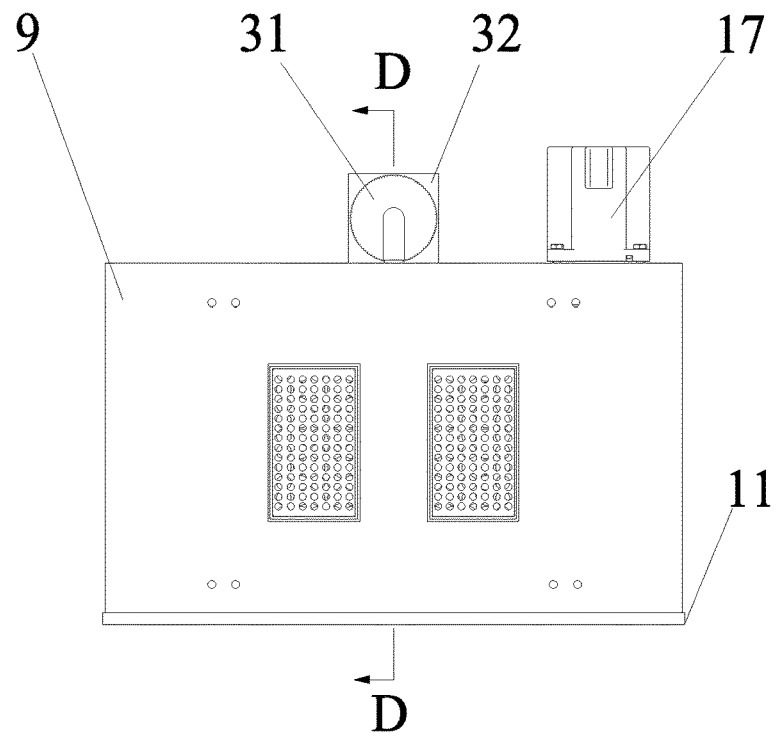
FIG. 10 is, a schematic top view of a filtering and recovering mechanism according to an embodiment of the present invention.
Figure 11:
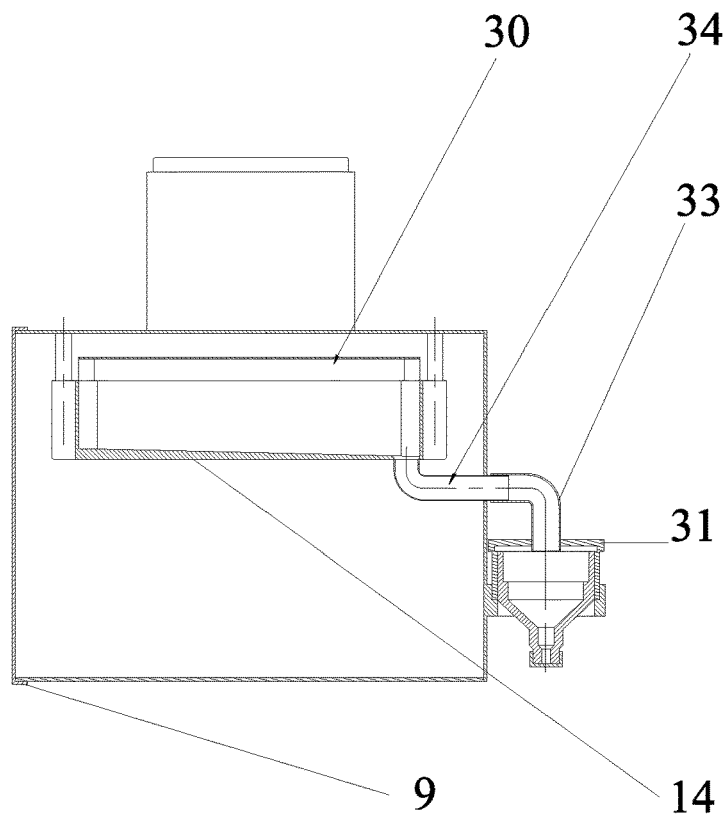
FIG. 11 is a schematic diagram of a direction D in FIG. 10 according to the present invention.
Figure 12:
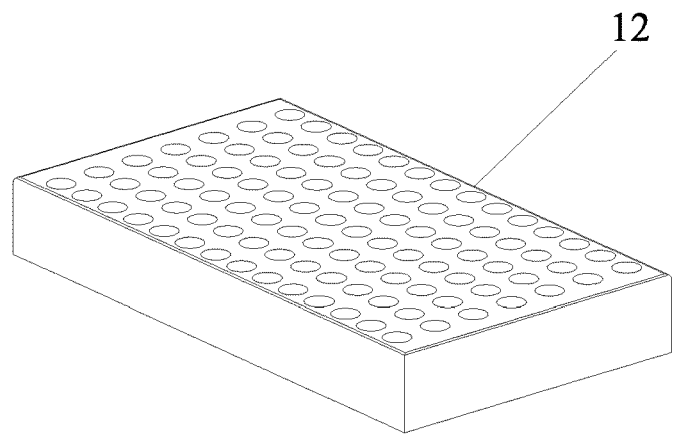
FIG. 12 is a structural schematic diagram of an electromagnetic plate according to an embodiment of the present invention.
Figure 13:
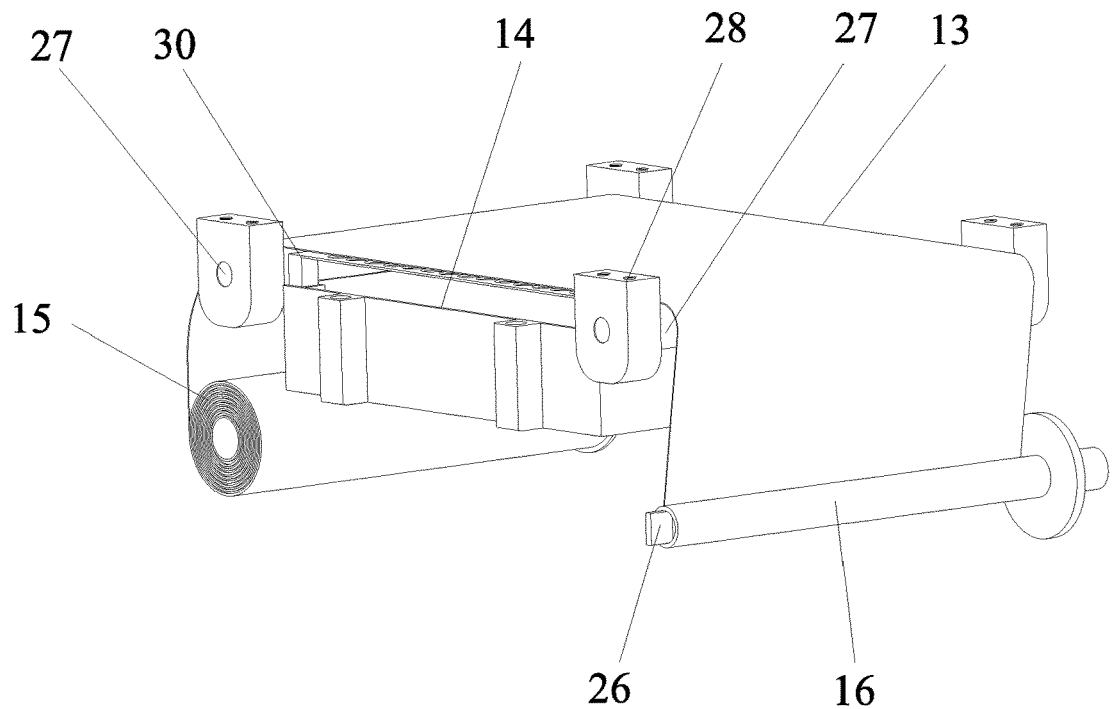
FIG. 13 is a structural schematic diagram of a filtering mechanism according to an embodiment of the present invention.
Figure 14:
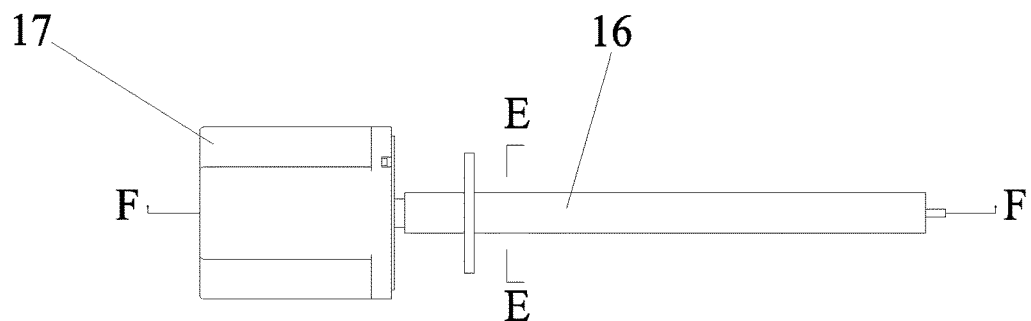
FIG. 14 is a structural schematic diagram of a filter paper storage device according to an embodiment of the present invention.
Figure 15:
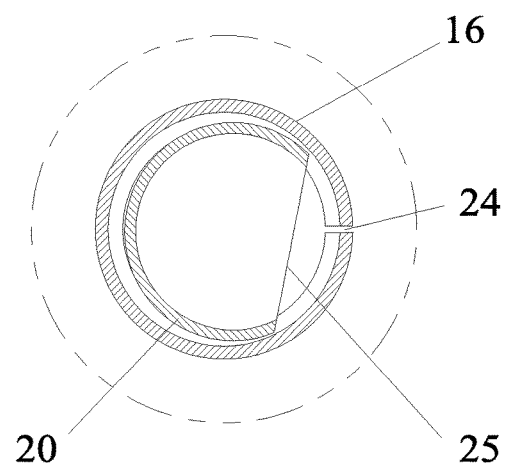
FIG. 15 is a schematic diagram of a direction E in FIG. 14 according to the present invention.
Figure 16:
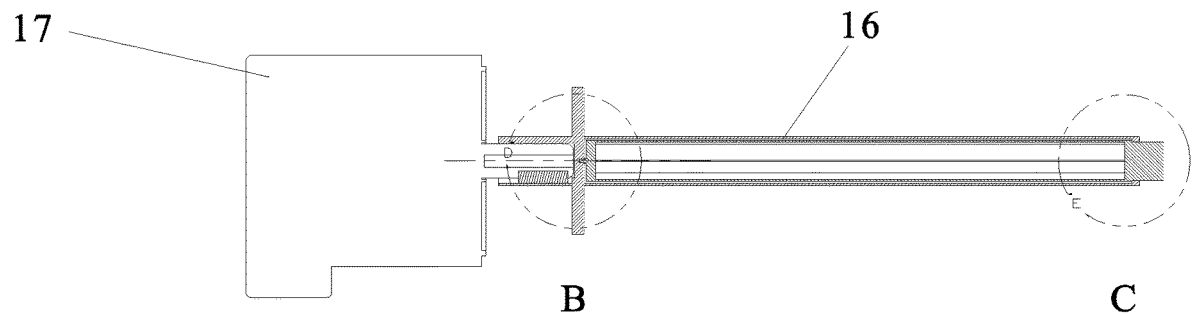
FIG. 16 is a schematic diagram of a direction F in FIG. 14 according to the present invention.
Figure 17:
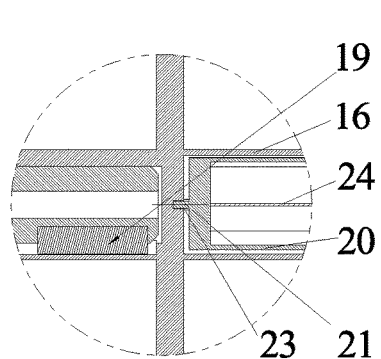
FIG. 17 is an enlarged view of a position B in FIG. 16 according to the present invention.
Figure 18:
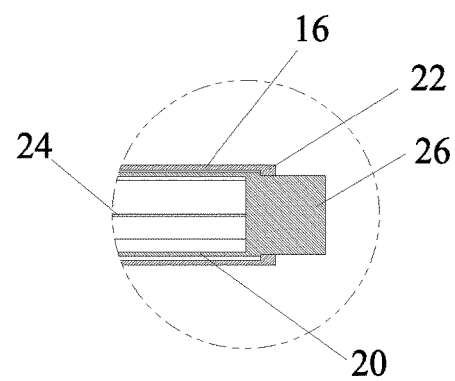
FIG. 18 is an enlarged view of a position C in FIG. 16 according to the present invention.
Figure 19:
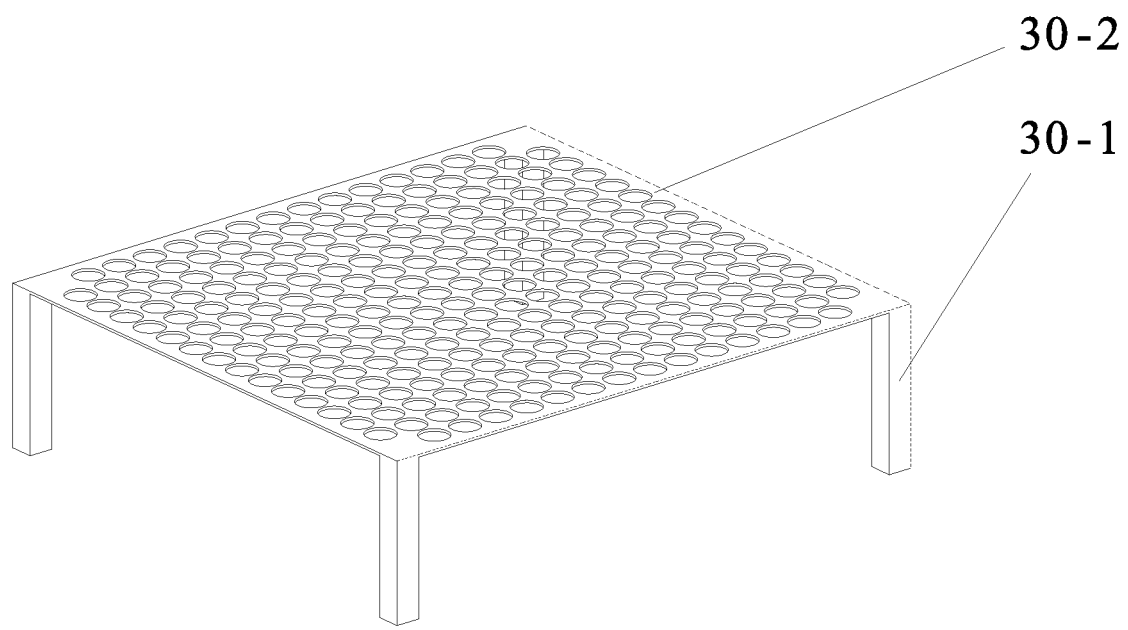
FIG. 19 is a structural schematic diagram of a mesh rack according to an embodiment of the present invention.
Figure 20:
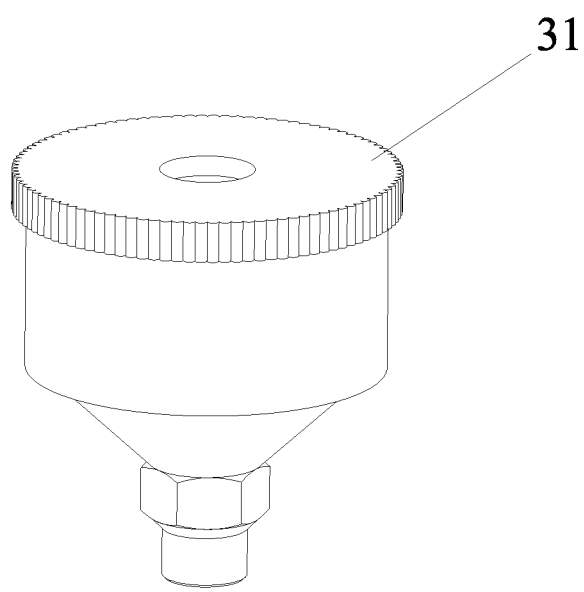
FIG. 20 is a structural schematic diagram of an oil cup according to an embodiment of the present invention.
Figure 21:
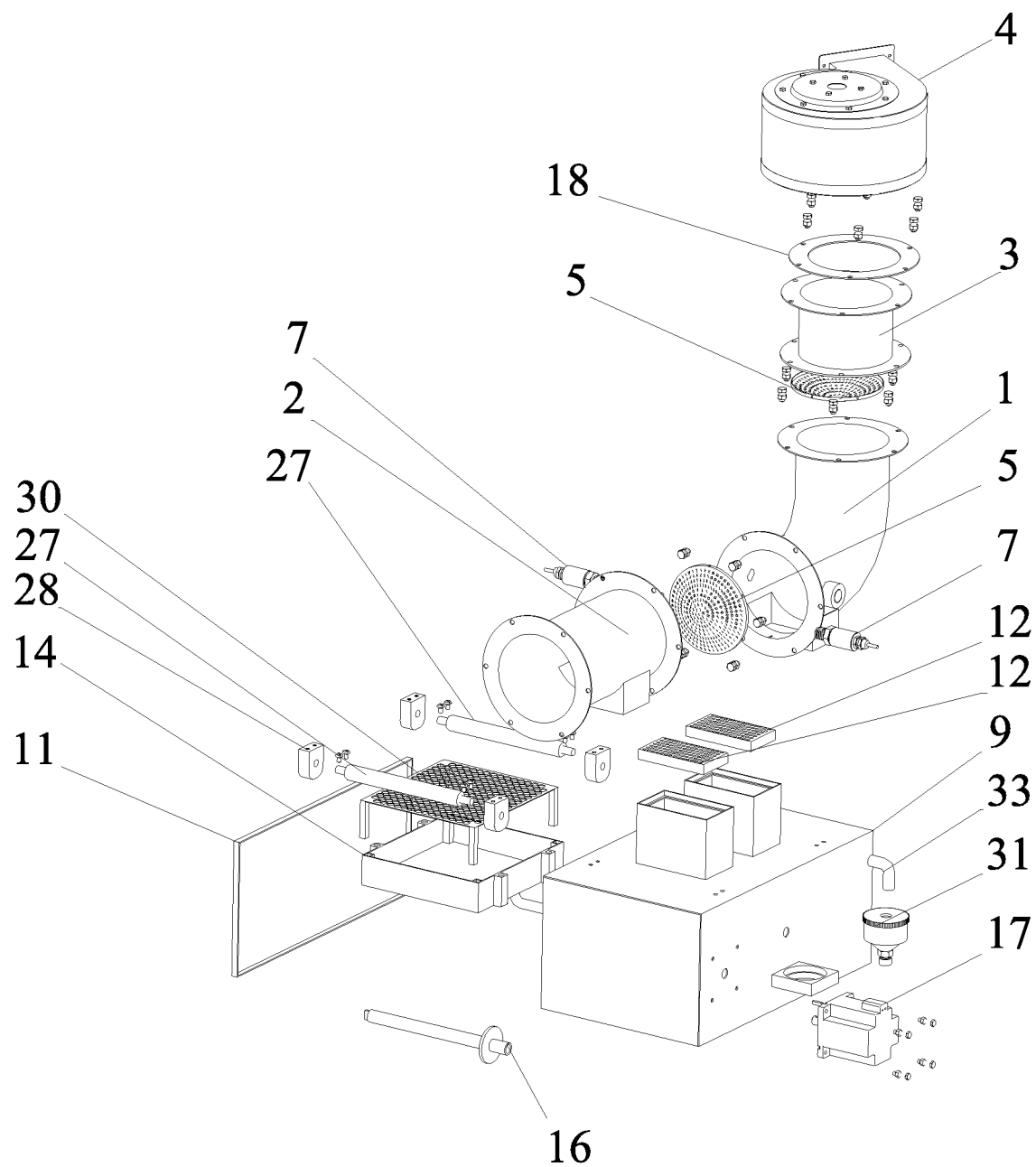
FIG. 21 is an exploded structural schematic diagram of an overall structure according to an embodiment of the present invention.

In a typical embodiment of the present application, as shown in FIGS. 1-21, the device for recovering, separating and purifying the oil mist in the MQL grinding process comprises:

an air separating mechanism used for separating oil mist and particles in air, wherein the air separating mechanism comprises a pipeline; the pipeline is in an L shape, and comprises an L-shaped pipe 1 composed of a horizontal pipe 1-1 and a vertical pipe 1-2, as well as a first straight pipe 2 and a second, straight pipe 3 located at both ends of the L-shaped pipe; the horizontal pipe of the L-shaped pipe is connected with an end part of the first straight pipe by a flange structure, bolts and nuts; the vertical pipe of the L-shaped pipe is connected with the end part of the second straight pipe by the flange structure, the bolts and the nuts; the horizontal pipe and the first straight pipe of the L-shaped pipe form a horizontal part of the pipeline; the vertical pipe and the second straight pipe of the L-shaped pipe form a vertical part of the pipeline; the end part of the first straight pipe is used as an air inlet; a fan 4 is fixed at a top end of the second straight pipe by the screws; the top end is sealed by a sealing ring 18; the fan is a single-stage centrifugal fan; the air pressure provided by the single-stage centrifugal fan is relatively large; residual particles in air flow passing through the pipeline can be separated by a centrifugal effect of the single-stage centrifugal fan; and meanwhile, negative pressure can be generated in the pipeline.

Two conical filter mesh mechanisms 5 are mounted in the pipeline; tips of the conical filter mesh mechanisms face to one side where an air inlet direction is located; one of the conical filter mesh mechanisms is mounted at the end part of a connecting end of the horizontal pipe and the first straight pipe of the L-shaped pipe; the other conical filter mesh mechanism is mounted at the end part of the connecting end of the second straight pipe and the vertical pipe; the conical filter mesh mechanisms comprise circular mounting rings 5-1; conical filter meshes 5-2 are fixed on the mounting rings; six mounting grooves 5-1-1 are formed in each mounting ring; clamping blocks 6 matched with the mounting grooves are arranged on inner surfaces of the horizontal pipe and the second straight pipe; the clamping blocks are clamped into the mounting grooves to realize clamping and fixed connection of the conical filter mesh mechanisms and the pipeline; the conical filter mesh mechanisms are conveniently disassembled from the pipeline to conveniently clean up impurity particles on the conical filter mesh mechanisms; two conical filter mesh mechanisms arranged in the L-shaped pipeline are adopted; and air flow passes through one conical filter mesh mechanism and then passes through the other conical filter mesh mechanism through the L-shaped pipeline, thereby effectively increasing oil mist condensing and separating time and improving oil mist separating efficiency.

During rotation of an impeller of the fan, power is applied to air to increase the pressure and speed of the air flow in the pipeline, so that the air, instantaneously changes the direction when passing through the conical filter mesh mechanisms at high speed; eddy current is generated around the conical filter mesh mechanisms so that the particles in the air collide at high speed, the negative pressure is formed, the temperature is reduced, other particles such as the oil mist in the air flow are separated out, and clean air is discharged from an air outlet of the fan along the pipeline under the action of centrifugal force.

The conical filter mesh has a mesh diameter of 0.2 cm and a mesh area of 0.0314 cm$^2$; multiple rows of meshes are arranged; each row of meshes are uniformly distributed along a circumference; an angle formed by centers of two adjacent circular holes on the same circumference and a center of a top end of the conical filter mesh is 3.75°; the meshes are uniformly and densely distributed to increase an air inlet area; aerodynamic principles are utilized to reduce air resistance and static air pressure, increase the air inlet speed and air volume, and make air inlet smoother; a cone angle of the conical filter mesh is 22°, so that an optimum resistance coefficient is realized, and oil droplets inside and outside the conical filter mesh mechanisms can fall smoothly.

Two pressure detection devices are in symmetrical threaded connection with the horizontal pipe of the L-shaped pipe; pressure sensors 7 are adopted as the pressure detection devices; the pressure sensors are used for detecting the pressure in the pipeline so as to obtain the amount of oil mist in the pipeline; and the volume of air generated by the fan can be adjusted to improve the oil mist separation efficiency.

Square first connecting pipes 8 are respectively arranged on the horizontal pipe and the first straight pipe, and are connected with a filtering and recovering, mechanism.

The filtering and recovering mechanism comprises a tank body 9, a filtering mechanism and a recovering mechanism. Two second connecting pipes 10 are arranged at the top of the tank body; the second connecting pipes are in plug connection with the first connecting pipes: the first connecting pipes and the second connecting pipes form a connecting part for connecting the pipeline with the tank body; the pipeline is communicated with an internal space of the tank body by the connecting part; a tank cover 11 is arranged on a tank wall at one side of the tank body; and various components in the tank body can be conveniently overhauled and maintained by opening the tank cover.

The filtering mechanism comprises an electromagnetic plate 12, filter paper 13 and an oil box 14 fixed inside the second connecting pipe.

The electromagnetic plate is used for absorbing metal grinding particles; and a filter paper cylinder and a filter paper storage device are respectively arranged at positions on both sides directly below a joint of the second connecting pipes and the tank wall at the top of the tank body in the tank body.

The filter paper cylinder 15 is rotationally connected with the tank wall of the tank body; the filter paper is wound on the filter paper cylinder; and the filter paper cylinder is used for winding unused part of the filter paper.

The filter paper storage device comprises a storage cylinder 16; the storage cylinder is connected with a driving mechanism located outside the tank body; the driving mechanism is a servo motor 17; a motor housing of the servo motor is fixed on the tank wall of the tank body; an output shaft of the servo motor extends into the tank body and is connected with the storage cylinder through a key 19; the servo motor can drive the storage cylinder to rotate; a rolling cylinder 20 is arranged inside the storage cylinder; one end of the rolling cylinder is provided with a connecting shaft 21 and is rotationally connected with the end part at the same side of the storage cylinder by the connecting shaft; an axis of the rolling cylinder is not in the same straight line with the axis of the storage cylinder; and both ends of the rolling cylinder are limited and fixed by a boss 22 arranged at the end part of the storage cylinder and a spacer bush 23 on the connecting shaft. A paper inlet 24 parallel to the axis of the storage cylinder is arranged on a cylinder wall of the storage cylinder; the paper inlet is located at a position where a distance between cylindrical surfaces of an inner cylinder surface of the storage cylinder and an outer cylinder surface of the rolling cylinder is minimum; the minimum distance between the cylindrical surfaces of the inner cylinder surface of the storage cylinder and the outer cylinder surface of the rolling cylinder meets the requirement that the inner cylinder surface of the storage cylinder can compress the filter paper together with the outer cylinder surface of the rolling cylinder; a notch 25 is formed in the cylinder wall of the rolling, cylinder; the end part of the filter paper can extend into the rolling cylinder through the paper inlet and the notch; a rotating plate 26 extending to the outside of the storage cylinder is arranged on the end part at one side, where the boss is located, of the rolling cylinder; and the operators, can conveniently rotate the rolling cylinder by the rotating plate.

Carrying idlers 27 are respectively arranged above the filter paper cylinder and the storage cylinder; both ends of the carrying idler are rotationally connected with carrying idler connecting plates 28; the carrying idler connecting plates are connected with the tank wall at the top of the tank body by bolts; and the carrying idler is used for tensioning filter paper between the filter paper cylinder and the storage cylinder.

During use, a movable end part of the filter paper is stretched; the filter paper is tensioned by the carrying idlers; the movable end part of the filter paper extends into the rolling cylinder through the paper inlet and the notch; and then the rolling, cylinder is rotated by a rotating plate, so that the outer cylinder surface of the rolling cylinder and the inner cylinder surface of the storage cylinder compress the filter paper, thereby realizing the connection of the filter paper and the filter paper storage device.

An oil box is arranged below a filter paper part between the filter paper cylinder and the filter paper storage device; the oil box is connected with the tank wall at the top of the tank body by a connecting rod 29; a mesh rack 30 is placed at the top of the oil box; the mesh rack comprises four supporting legs 30-1 and a metal mesh 30-2 fixed at the tops of the supporting legs; and the mesh rack, is used for supporting the filter paper.

The oil liquid flowing through the electromagnetic plate falls on the filter paper; the oil liquid is further filtered by the filter paper; the filtered oil liquid falls into the oil box through the metal mesh; and the filtered oil liquid is collected by the oil box.

The oil box is connected with a recovering mechanism; the recovering mechanism is used for recovering the oil liquid in the oil box and comprises an, oil cup 31 located outside the tank body; the oil cup is placed on an oil cup support 32; the oil cup support is fixedly connected with the tank wall of the tank body; the oil cup is connected with the oil box through a first oil pipe 33, a second oil pipe 34 and an oil outlet on the oil box; the oil outlet is formed in a bottom surface of the oil box; the bottom surface of the oil box is an inclined surface; and the oil outlet is located at a position with a low height on the bottom surface of the oil box, so that the oil liquid can flow out conveniently.

In the present embodiment, the pressure sensor, the fan and the servo motor are all connected with a control device and are controlled to operate by the control device.

When the device in the present embodiment works, the tank cover is opened in advance; the movable end of the filter paper is connected with the filter paper storage device; then the tank cover is closed; the fan is started; the fan generates negative pressure in the pipeline; air flows in from the air inlet of the first straight pipe and is discharged through the air outlet of the fan; when the air flows in the pipeline, the air flows through two conical filter mesh mechanisms; the conical filter mesh mechanisms make the oil mist aggregated into the oil droplets by utilizing inertial collision of the eddy current and particles generated around the filter mesh by the air flow, thereby separating out the oil mist and chips; the air discharged from the air outlet of the fan is clean air; the grinding particles fall into the second connecting pipes through the first connecting pipes; the oil mist falls into the second connecting pipes through the first connecting pipes in the form of droplets; the electromagnetic plates in the second connecting pipes adsorb and fix the metal grinding particles; the oil mist droplets fall on the filter paper after penetrating through the electromagnetic plate; the filter paper further filters the oil mist droplets; the filtered oil liquid falls into the oil box after penetrating through the metal mesh of the mesh rack; and the filtered oil liquid flows into the oil cup through the oil outlet at the bottom of the oil box by the first oil pipe and the second oil pipe, thereby recovering and reutilizing the oil liquid.

After the filter paper is used, for a period of time, the servo motor drives the storage cylinder to rotate; the used part of the filter paper is wound on an outer circumferential surface of the storage cylinder; and the filter paper conducts filtration operation again with a new part.

The device for recovering, separating and purifying the oil mist in the present embodiment is suitable for the machining fields such as semi-closed grinding machines, closed grinding machines and milling machines, not only separates the oil mist in the machining process, but also purifies the oil mist so that the oil mist is reutilized, thereby meeting the requirements of green manufacturing and machining. The device makes the air in the machining space cleaner and fresher and more beneficial to the health of workers, makes a surface of the machine free of oil stains, prolongs the service life of the machine, realizes a better working environment, better ensures the quality of products, and also improves efficiency.

The specific embodiments of the present invention are described above with reference to the drawings, but do not limit a protection scope of the present invention. Those skilled in the art should understand that various modifications or variations that can be made by those skilled in the art without contributing creative labor on the basis of the technical solution of the present invention still fall within the protection scope of the present invention.

We claim:

1. A device for recovering, separating and purifying oil mist in a minimum quantity lubricant (MQL) grinding process, comprising:
    an air and oil mist separating mechanism, which is used for separating oil mist and particles in air and comprising a pipeline having an inlet end and an outlet end and a fan fixedly connected to the outlet end of the pipeline, and being used for creating a negative pressure in the pipeline, at least one conical filter mesh mechanism, which comprises a conical filter mesh, arranged in the pipeline with a tip of the conical filter mesh mechanism facing toward the inlet end of the pipeline, and the conical filter mesh mechanism being used for separating the oil mist and the particles in the air;

a filtering and recovering mechanism, which is connected and in communication with the pipeline by a connecting part, and located under the conical filter mesh mechanism for filtering and recovering the oil mist separated by the air separating mechanism, and comprising a tank body, a filtering mechanism comprising an electromagnetic plate arranged in the connecting part, and an oil box arranged within the tank body with a filter paper arranged thereabove, and a recovering mechanism connected to the filtering mechanism and wherein the recovering mechanism comprises an oil cup fixed outside the tank body;

wherein the connecting part that connects the tank body to the pipeline comprises two connecting pipe assemblies that are respectively arranged upstream and downstream of the at least one conical filter mesh mechanism arranged in the pipeline.

2. The device for recovering, separating and purifying oil mist in the MQL grinding process according to claim 1, wherein the pipeline is an L-shaped pipeline and comprises a horizontal part and a vertical part; the horizontal part is connected with the filtering and recovering mechanism through the connecting part; and an end part of the vertical part is connected with the fan.

3. The device for recovering, separating and purifying oil mist in the MQL grinding process according to claim 1, wherein the at least one conical filter mesh mechanism comprises a mounting ring; a conical filter mesh is fixed on the mounting ring; a plurality of mounting grooves are formed in the mounting ring; and the mounting ring is fixedly connected by clamping the mounting grooves and clamping blocks arranged on an inner surface of the pipeline.

4. The device for recovering, separating and purifying oil mist in the MQL grinding process according to claim 1, wherein the pipeline is s connected with a pressure detection device for detecting air pressure in the pipeline.

5. The device for recovering, separating and purifying oil mist in the MQL grinding process according to claim 1, wherein one end of the filter paper is wound on a filter paper cylinder rotationally connected with a tank wall of the tank body; the filter paper cylinder is used for winding an unused part of the filter paper; the other end of the filter paper is connected with a filter paper storage device; and the filter paper storage device is used for storing a used part of the filter paper.

6. The device for recovering, separating and purifying oil mist in the MQL, grinding process according to claim 5, wherein a carrying idler is also arranged in the tank body and is used for tensioning a filter paper part between the filter paper cylinder and the filter, paper storage device.

7. The device for recovering, separating and purifying oil mist in the MQL grinding process according to claim 5, wherein an upper part of the oil box is connected with a mesh rack; and the mesh rack is used for supporting the filter paper part above the oil box.

8. The device for recovering, separating and purifying oil mist in the MQL grinding process according to claim 5, wherein the filter paper storage device comprises a storage cylinder; the storage cylinder is connected with a driving mechanism; the driving mechanism is used for driving the rotation of the storage cylinder; a rolling cylinder is arranged in the storage cylinder; the end part of one side of the rolling cylinder is rotationally connected with the end part of the same side of the storage cylinder; an axis of the rolling cylinder is not in the same straight line with the axis of the storage cylinder; a paper inlet parallel to the axis of the storage cylinder is arranged on a cylinder wall of the storage cylinder; the paper inlet is located at a position where a distance between cylindrical surfaces of an inner cylinder surface of the storage cylinder and an outer cylinder surface of the rolling cylinder is minimum; a notch is formed in the cylinder wall of the rolling cylinder; the end part of the filter paper can extend into the rolling cylinder through the paper inlet and the notch; and the minimum distance between the cylindrical surfaces of the inner cylinder surface of the storage cylinder and the outer cylinder surface of the rolling cylinder meets a requirement that the inner cylinder surface of the storage cylinder can compress the filter paper together with the outer cylinder surface of the rolling cylinder.

9. The device for recovering, separating and purifying oil mist in the MQL, grinding process according to claim 1, wherein the recovering mechanism the oil cup is connected with one end of an oil pipe and the other end of the oil pipe extends into the tank body and is connected with the oil box.

\* \* \* \* \*